United States Patent [19]
Ueda et al.

[11] Patent Number: 5,085,845
[45] Date of Patent: Feb. 4, 1992

[54] PRODUCTION AND USE OF CRYSTALLINE HYDROGEN-PHOSPHATE COMPOUNDS HAVING LAYER STRUCTURE

[75] Inventors: Shiunkichi Ueda, Izumiootsu; Tomoe Suita, Ibaraki; Masahiko Murakami, Osaka; Mitsutomo Tsuhako, Nishinomiya, all of Japan

[73] Assignee: Tayca Corporation, Osaka, Japan

[21] Appl. No.: 603,051

[22] Filed: Oct. 25, 1990

[30] Foreign Application Priority Data

Nov. 2, 1989 [JP] Japan .................................. 1-286684
May 16, 1990 [JP] Japan .................................. 2-127814

[51] Int. Cl.$^5$ ........................ C01B 15/16; C01B 25/26
[52] U.S. Cl. .................................... 423/308; 210/682; 423/309; 502/400
[58] Field of Search ................................ 423/308, 309

[56] References Cited

U.S. PATENT DOCUMENTS 3,416,884 12/1968 Stynes et al. ..................... 423/181
4,826,663 5/1989 Albertl et al. ..................... 423/308

Primary Examiner—Wayne A. Langel
Attorney, Agent, or Firm—Varndell Legal Group

[57] ABSTRACT

A process for preparing a crystalline layered hydrogen-phosphate in a shortened period of time in high efficiency, which comprises reacting a tetravalent metal compound with phosphoric acid or its salt at an elevated temperature with introducing steam into the reaction system. Crystalline layered cerium(IV) bis(hydrogen-phosphate), particularly cerium(IV) bis(hydrogen-phosphate) dihydrate prepared by the above process, has an excellent ability of selectively adsorbing cesium ion, and is useful as a cesium ion adsorbent.

9 Claims, 3 Drawing Sheets

PRODUCTION AND USE OF CRYSTALLINE HYDROGEN-PHOSPHATE COMPOUNDS HAVING LAYER STRUCTURE

BACKGROUND OF THE INVENTION

The present invention relates to a process for preparing crystalline phosphate compounds having layer structure, and more particularly to a process for preparing crystalline layered hydrogenphosphates in a short period of time in a high efficiency, and use of the hydrogenphosphates as a metal ion adsorbent.

Hitherto, crystalline hydrogenphosphate compounds having layer structure have been prepared, for instance, by (1) a reflux process [A. Clearfield and J. A. Stynes, J. Inorg. Nucl. Chem., 26, 117(1964)] or (2) a fluorination complex process [J. M. Troup and A. Clearfield, Inorganic Chemistry, Vol. 16, No. 12, 3311(1977)]. In the reflux process (1), the crystalline hydrogenphosphates are prepared by refluxing amorphous phosphate in concentrated phosphoric acid for 24 to 100 hours. The process (1) requires the use of a large excess of concentrated phosphoric acid and a long period of time for the reaction and, therefore, it is economically disadvantageous for the industrial production. The fluorination complex process (2) also has a problem in safety because harmful hydrogen fluoride is used.

Also, it is proposed in Japanese Patent Publication Kokai No. 62-226807 to prepare crystalline layered zirconium hydrogenphosphate by hydrothermal synthesis. The hydrothermal synthesis requires high temperature and high pressure and, therefore, the proposed process has the disadvantage that the apparatus material must be resistant to a strong acid such as phosphoric acid under high temperature and high pressure when the process is practiced on an industrial scale.

The crystalline hydrogenphosphates have characteristics as a solid acid and are reactive with various cations, basic materials, organic amines and the like.

It is reported that titanium hydrogenphosphate and zirconium hydrogenphosphate are useful as an adsorbent for adsorbing cesium ion (ANS Topical Meeting, Fuel Reprocessing and Waste Management Proceedings 1984, Vol. II, pages 163-176). Sodium nitrate waste liquid from reprocessing of used nuclear fuel arising from atomic power stations contains cesium ion as a high level radioactive waste and, therefore, upon the disposal thereof it is necessary to remove or fix cesium ion, for instance, by selectively adsorbing it. However, according to the inventors' research, titanium hydrogenphosphate and zirconium hydrogenphosphate are not suitable for use as an adsorbent for removing cesium ion from such a waste liquid. Titanium hydrogenphosphate has an ability for adsorbing cesium ion, but it simultaneously adsorbs sodium ion. Because of poor selectivity, it cannot selectively and efficiently adsorb only cesium ion from a radioactive material-containing waste liquid which contains a large quantity of sodium ion, e.g. sodium nitrate waste liquid in reprocessing of used nuclear fuel. Zirconium hydrogenphosphate has little ability of adsorbing cesium ion and accordingly it has no practicality.

It is an object of the present invention to provide a process for preparing crystalline layered hydrogenphosphates economically in a shortened period of time in a high efficiency.

A further object of the invention is to provide a process for preparing crystalline layered hydrogenphosphates which are useful as adsorbent or inorganic ion exchanger, or are applicable to intercalation.

Another object of the invention is to provide an adsorbent capable of selectively and efficiently adsorbing cesium ion from a radioactive material-containing waste liquid.

These and other objects of the present invention will become apparent from the description hereinafter.

SUMMARY OF THE INVENTION

It has now been found that crystalline layered hydrogenphosphates can be efficiently prepared in a very short period of time by blowing steam into the reaction system wherein a tetravalent metal compound and a phosphoric acid source such as phosphoric acid or its salt are mixed and reacted at an elevated temperature.

Accordingly, in accordance with the present invention, there is provided a process for preparing a crystalline layered hydrogenphosphate which comprises reacting a tetravalent metal compound and a phosphoric acid source at an elevated temperature in the presence of steam introduced.

The crystalline layered hydrogenphosphates are compounds having water of crystallization. It is considered that the reason why the production of the desired compounds is achieved in a shortened period of time is that the reaction product would become a state easy to possess water of crystallization as a result of introducing steam to the reaction system from the outside during the reaction of the tetravalent metal compound and the phosphoric acid source and conducting the reaction in the steam atmosphere. Also, according to the present invention, since the reaction proceeds easily, use of a large quantity of phosphoric acid source as in a conventional process is not required, thus the efficiency is greatly improved. For instance, according to the process of the present invention, the production of crystalline layered hydrogenphosphates can be achieved by the reaction for about 3 to about 5 hours, whereas the conventional reflux process requires a reaction time of 24 to 100 hours, usually about 48 hours. Also, the phosphoric acid source required in the process of the present invention is at most about 2.5 times the amount of the tetravalent metal compound in terms of $P_2O_5/MO_2$ molar ratio wherein $MO_2$ is a tetravalent metal oxide, whereas the conventional reflux process requires a large excess of concentrated phosphoric acid, namely phosphoric acid in an amount of more than 10 times the amount of the tetravalent metal compound in terms of $P_2O_5/MO_2$ molar ratio.

The process of the present invention has another feature that it can provide crystalline layered cerium-(IV) bis(hydrogenphosphate) dihydrate of the formula: $Ce(HPO_4)_2 \cdot 2H_2O$ having a layer-to-layer distance as large as 18.0 Å (1.80 nm), which has not been obtained by conventional processes. The known crystalline layered cerium hydrogenphosphate prepared by conventional processes is a compound represented by the formula: $Ce(HPO_4)_2 \cdot 1.33H_2O$, the layer-to-layer distance of which is 15.9 Å (1.59 nm).

The crystalline layered hydrogenphosphates prepared according to the process of the present invention are suited for use in adsorbent, inorganic ion exchanger and intercalation.

It has been also found that among crystalline layered hydrogenphosphates, cerium hydrogenphosphate, particularly cerium hydrogenphosphate prepared by the process of the invention, has a large layer-to-layer distance, and it has an excellent ability of selectively adsorbing cesium ion.

Accordingly, in another aspect of the present invention, there is provided a cesium ion adsorbent comprising a crystalline layered cerium(IV) bis(hydrogenphosphate).

DETAILED DESCRIPTION

Figure 1:
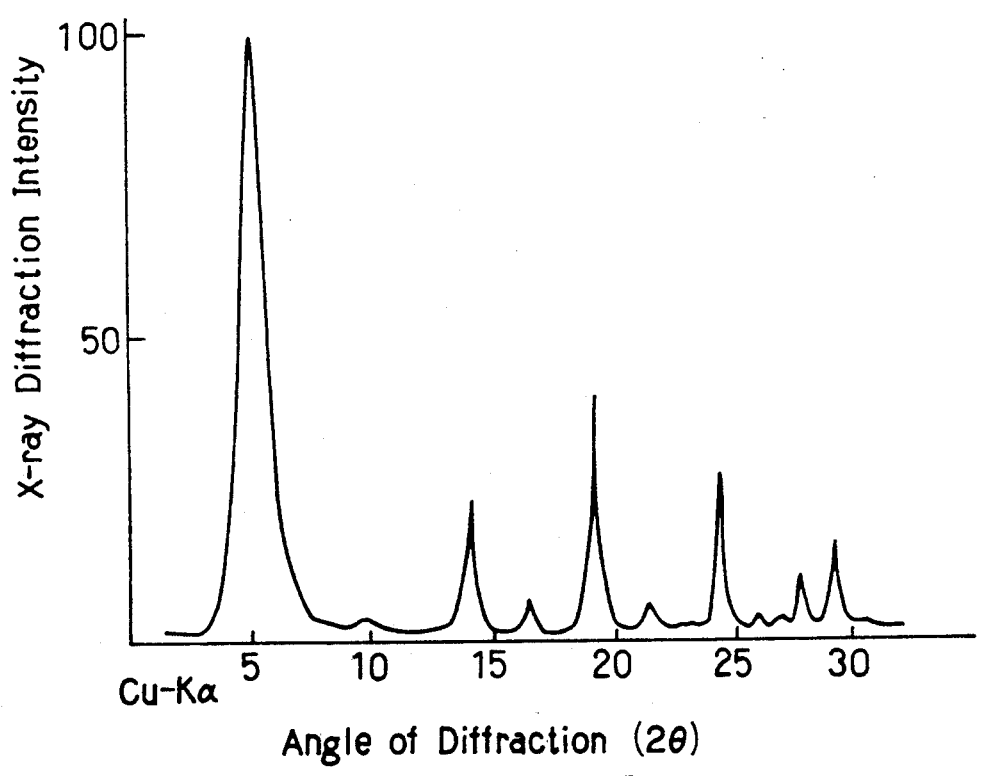
FIG. 1 is an X-ray diffraction pattern of crystalline layered cerium hydrogenphosphate $Ce(HPO_4)_2 \cdot 2H_2O$ prepared by the process of the present invention.

The tetravalent metal compounds used in the process of the present invention as the raw material include, for instance, oxides, hydroxides, carbonates, sulfates, nitrates, chlorides and so on of at least one metal element selected from the group consisting of cerium and metal elements of Group IV of the Periodic Table such as titanium, zirconium, hafnium, germanium, tin and lead. The metal compounds may be used alone or in admixture thereof.

The phosphoric acid sources used in the process of the present invention include, for instance, phosphoric acid (e.g. commercially available 85% phosphoric acid), and phosphates, e.g. ammonium phosphate and an alkali metal phosphate such as sodium phosphate or potassium phosphate. These compounds may be used alone or in admixture thereof.

In the process of the present invention, the preparation of crystalline layered hydrogenphosphates is carried out by mixing the tetravalent metal compound and the phosphoric acid source, and reacting them at an elevated temperature, for example, at a temperature of 80° to 300° C., especially 100° to 300° C., for 2 to 10 hours, especially 3 to 6 hours, in the presence of steam blown into the reaction system. If steam is not introduced into the reaction system, a reaction time as short as 3 to 5 hours does not cause the reaction to proceed at all or does not give the desired product. After the completion of the reaction, the reaction product is usually washed with water and dried at a temperature between room temperature and about 300° C., especially at a low temperature, for example, at a temperature below about 60° C.

Different two reaction manners can be adopted depending of the kind of tetravalent metal compounds used.

One of them is a process wherein an oxide, hydroxide or carbonate of cerium or a metal element of Group IV of the Periodic Table, or a mixture thereof is used as the tetravalent metal compound, it is admixed with phosphoric acid, steam is blown into the reaction system and they are reacted under heating in the presence of steam.

Another process is applicable to the case where the tetravalent metal compound used is soluble i0 water, that is, it is a halide or water-soluble salt, e.g. sulfate or nitrate, of cerium or a metal element of Group IV of the Periodic Table, or a mixture thereof. In that case, phosphoric acid or a water-soluble phosphate such as sodium, potassium or ammonium phosphate is used as the phosphoric acid source. An aqueous solution of the tetravalent metal compound and an aqueous solution of the phosphoric acid source are admixed with stirring at room temperature or an elevated temperature below the boiling point of water, the resulting gel-like precipitate is separated by filtration or centrifugation and is subjected to the reaction under heating in the presence of steam blown into the reaction system.

In both cases, the molar ratio of the raw materials subjected to the reaction in a steam atmosphere, namely the molar ratio of the phosphoric acid source to the tetravalent metal compound, is preferably from 0.5:1.0 to 2.5:1.0 in terms of $P_2O_5/MO_2$ wherein M is a tetravalent metal element and $MO_2$ is a tetravalent metal oxide. The use of the raw materials in amounts outside the above range is uneconomical, since when the molar ratio is less than 0.5, the tetravalent metal compound remains unreacted in a larger amount, and since when the molar ratio is more than 2.5, an excess amount of the phosphoric acid source remains. More preferably, the molar ratio is within the range of 1.0:1.0 to 2.0:1.0 in terms of $P_2O_5/MO_2$.

The amount or flow rate of steam introduced into the reaction system is not particularly limited. The introduction of steam is usually conducted by blowing steam into the head space over the reactant mixture in a reactor from the outside. Preferably, steam heated to a temperature on the same level as the reaction temperature is introduced into the reaction system so as not to lower the reaction temperature. The introduction of steam is not necessarily required in an early stage of the reaction. However, in the stage after free water has evaporated from the mixture of reactants, it is necessary to introduce steam into the reaction system. Of course, the introduction of steam may be done always throughout the reaction period. Preferably the introduction of steam is conducted continuously, but may be conducted intermittently at appropriate intervals.

As the crystalline layered hydrogenphosphates, there are known, for instance, the following compounds.

$Ti(HPO_4)_2 \cdot H_2O$ (layer-to-layer distance 7.6 Å)
$Ti(HPO_4)_2 \cdot 2H_2O$ (layer-to-layer distance 11.6 Å)
$Zr(HPO_4)_2 \cdot H_2O$ (layer-to-layer distance 7.6 Å)
$Zr(HPO_4)_2 \cdot 2H_2O$ (layer-to-layer distance 12.2 Å)
$Hf(HPO_4)_2 \cdot H_2O$ (layer-to-layer distance 7.6 Å)
$Sn(HPO_4)_2 \cdot 2H_2O$ (layer-to-layer distance 7.8 Å)
$Pb(HPO_4)_2 \cdot H_2O$ (layer-to-layer distance 7.8 Å)
$Ce(HPO_4)_2 \cdot 1.33H_2O$ (layer-to-layer distance 15.9 Å)

According to the present invention, these known crystalline compounds can be prepared in a shortened period of time in an improved efficiency as compared with conventional processes.

Further, the process of the present invention can easily provide a crystalline layered cerium hydrogenphosphate having a large layer-to-layer distance, namely crystalline layered cerium(IV) bis(hydrogenphosphate) dihydrate of the formula: $Ce(HPO_4)_2 \cdot 2H_2O$, having a layer-to-layer distance of 18.0 Å. Of course, this compound can be prepared efficiently in a short period of time by the process of the present invention.

The crystalline layered hydrogenphosphate compounds have characteristics as solid acid and also have a layer structure. Accordingly, utilizing these characteristics, they can be used as adsorbent or inorganic ion exchanger, or can be used for intercalation. Particularly, crystalline layered cerium (IV) bis(hydrogenphosphate) dihydrate has a very large layer-to-layer distance and, therefore, it would be able to adsorb materials having a larger size as compared with other crystalline layered hydrogenphosphate compounds.

The present inventors made researches on characteristics of the crystalline layered hydrogenphosphate compounds, and have found that the cerium salts, including cerium(IV) bis(hydrogenphosphate) dihydrate [Ce(HPO$_4$)$_2$·2H$_2$O] prepared according to the process of the present invention, have an excellent ability of selectively adsorbing cesium ion. Since crystalline layered cerium hydrogenphosphate, particularly the dihydrate, has an excellent selectivity to cesium ion and can selectively, efficiently adsorb cesium ion even in the presence of a large quantity of sodium ion, it can be effectively used for treating a radioactive material-containing waste liquid which contains a large quantity of sodium ion, such as a sodium nitrate waste liquid in reprocessing of used nuclear fuel.

The reason why the crystalline layered cerium hydrogenphosphate has an excellent selective cesium ion adsorbency differing from other crystalline layered hydrogenphosphates is not made clear at present, but it is considered to be based on difference in cation exchange ability as inorganic ion exchanger between cerium and other metals such as titanium and zirconium, and difference in ability of intercalating cesium ion between layers. It is also considered to be an large factor for showing an ion adsorbency different from that of other crystalline layered hydrogenphosphates that the cerium salt has a larger layer-to-layer distance than others.

The crystalline layered cerium hydrogenphosphate represented by the formula: Ce(HPO$_4$)$_2$·xH$_2$O wherein x is from 0 to 2, can be used as the cesium ion adsorbent. The larger the layer-to-layer distance, the higher the selective cesium ion adsorbency. Crystalline layered cerium bis(hydrogenphosphate) dihydrate of the formula: Ce(HPO$_4$)$_2$·2H$_2$O is particularly preferred.

The crystalline layered cerium hydrogenphosphate may be used alone or in admixture thereof as the cesium ion adsorbent, and it exhibits an excellent cesium ion adsorbency. The crystalline layered cerium hydrogenphosphate may also be used in combination with other crystalline layered hydrogenphosphates, whereby an increased amount of cesium ion can be adsorbed.

It is suitably determined in accordance with the purposes or situation of use whether the crystalline layered cerium hydrogenphosphate is used alone or in combination with other crystalline hydrogenphosphate compounds. That is to say, the single use of the crystalline layered cerium hydrogenphosphate is superior to the selectivity to cesium ion and, therefore, it is suitable for removing cesium ion from a radioactive material-containing waste liquid which contains a slight amount of cesium ion together with a large amount of sodium ion. The combination use with other crystalline layered hydrogenphosphates is suitable for the treatment of the waste liquid containing cesium ion in a relatively high concentration, since the amount of cesium ion adsorbed is synergistically increased and is larger than the single use of each of the cerium salt and other metal salts to be combined, though the selectivity to cesium ion is lowered as compared with the single use.

When a mixture of the cerium hydrogenphosphate and other hydrogenphosphates is used as the cesium ion adsorbent, it is preferable that the content of the cerium hydrogenphosphate in the mixture is at least 50% by weight. When the content of the cerium hydrogenphosphate is less than 50% by weight, both the selective cesium ion adsorbency and the cesium ion adsorption capacity are lowered.

Examples of the other crystalline layered hydrogenphosphates used with the cerium hydrogenphosphate are, for instance, titanium hydrogenphosphate of the formula: Ti(HPO$_4$)$_2$·xH$_2$O wherein x is from 0 to 2, zirconium hydrogenphosphate of the formula: Zr(HPO$_4$)$_2$·xH$_2$O wherein x is from 0 to 2, aluminum hydrogenphosphate, and other tetravalent metal hydrogenphosphates. Titanium, zirconium and aluminum salts are preferable.

The crystalline layered cerium hydrogenphosphate used as the cesium ion adsorbent may be those prepared by any processes, but those prepared by the above-mentioned process of the present invention are preferably used. The titanium, zirconium and other tetravalent metal hydrogenphosphates used in the cesium ion adsorbent can be also prepared by the above-mentioned process of the present invention.

The crystalline layered aluminum hydrogenphosphate has a structural formula different from those of tetravalent metal hydrogenphosphates, since aluminum is trivalent. Representative example of the crystalline layered aluminum hydrogenphosphate used in the adsorbent of the invention is aluminum dihydrogentriphosphate of the formula: AlH2P$_3$O$_{10}$·2H$_2$O. It is commercially available. Also, it can be prepared by the process as disclosed in Japanese Patent Publication Kokoku No. 51-560.

The crystalline layered cerium hydrogenphosphate and other hydrogenphosphate are usually obtained in the form of fine powder. Accordingly, the adsorption treatment of a radioactive material-containing waste liquid is conducted, for instance, by adding the fine powder to the waste liquid, and filtering off the powder after the completion of the adsorption. The crystalline layered cerium hydrogenphosphate powder or a powder mixture thereof with other hydrogenphosphates may be admixed with an appropriate binder and formed into a desired shape for the purpose of easy handling. The used binder may be any of organic and inorganic binders, but from the viewpoint of radiation resistance, inorganic binders such as water glass, silica sol and alumina sol are preferred.

The disposal of the adsorbent used for cesium ion adsorption treatment can be made according to the method conventionally known as an radioactive cesium disposal method, for instance, by glassification wherein the adsorbent is heat-treated at a temperature over 1,000° C. to solidify it as a phosphate glass.

The present invention is more specifically described and explained by means of the following Examples in which all % are by weight unless otherwise noted. It is to be understood that the present invention is not limited to the Examples.

EXAMPLE 1

In a porcelain crucible, 19.5 g of cerium oxide (guaranteed reagent 99% CeO$_2$) and 31.2 g of 85% phosphoric acid were thoroughly admixed (P$_2$O$_5$/CeO$_2$=1.2/1.0 by mole). The crucible containing the resulting mixture was placed in an electric furnace maintained at 180° C., and cerium oxide and phosphoric acid were reacted at 180° C. for 4 hours with blowing steam heated at 180° C. into the furnace to give a light yellowish reaction product. The product was washed with water and air-dried.

The X-ray diffraction pattern of the air-dried product is shown in FIG. 1.

It is observed in FIG. 1 that there is a strong peak at the lowest angle near 5°. From the results of the X-ray diffractiometry and the elementary analysis, it was confirmed that the obtained material was crystalline layered cerium(IV) bis(hydrogenphosphate) dihydrate $Ce(HPO_4)_2 \cdot 2H_2O$.

EXAMPLE 2

In a porcelain crucible, 26.5 g of cerium hydroxide $[Ce(OH)_4 \cdot 3/2H_2O]$ and 31.2 g of 85% phosphoric acid were thoroughly admixed ($P_2O_5/CeO_2 = 1.2/1.0$ by mole). The crucible containing the resulting mixture was placed in an electric furnace maintained at 200° C., and cerium hydroxide and phosphoric acid were reacted at 200° C. for 4 hours with blowing steam heated at 200° C., into the furnace to give a light yellowish reaction product.

Figure 2:
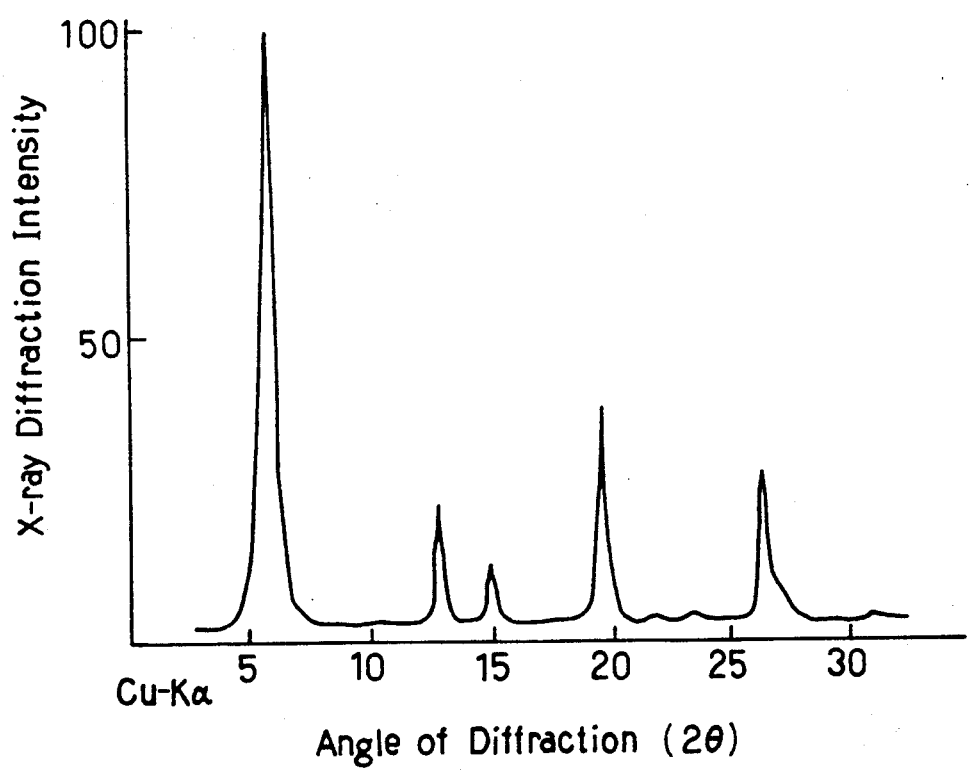
FIG. 2 is an X-ray diffraction pattern of crystalline layered cerium hydrogenphosphate $Ce(HPO_4)_2 \cdot 0.33H_2O$ obtained by drying at a high temperature (180° C.) the product obtained by the process of the present invention.

The product was washed with water and dried at 180° C. The X-ray diffraction pattern of the product dried at 180° C. is shown in FIG. 2. From the results of the X-ray diffractiometry and the elementary analysis, it was confirmed that the obtained product was crystalline layered cerium hydrogenphosphate of the formula: $Ce(HPO_4)_2 \cdot 0.33H_2O$.

EXAMPLE 3

The procedure of Example 2 was repeated except that the reaction product was washed with water and dried at 100° C.

From the results of the X-ray diffractiometry and the elementary analysis, it was confirmed that the obtained product was crystalline layered cerium hydrogenphosphate of the formula: $Ce(HPO_4)_2 \cdot 1.33H_2O$.

EXAMPLE 4

In a porcelain crucible, 15.9 g of zirconium hydroxide $[Zr(OH)_4]$ and 34.6 g of 85% phosphoric acid were thoroughly admixed ($P_2O_5/ZrO_2 = 1.5/1.0$ by mole). The resulting mixture was placed together with the crucible in an electric furnace maintained at 150° C., and the reaction was conducted at 150° C. for 5 hours with blowing steam heated at 150° C. into the furnace to give a white reaction product. The product was washed with water and air-dried.

Figure 3:
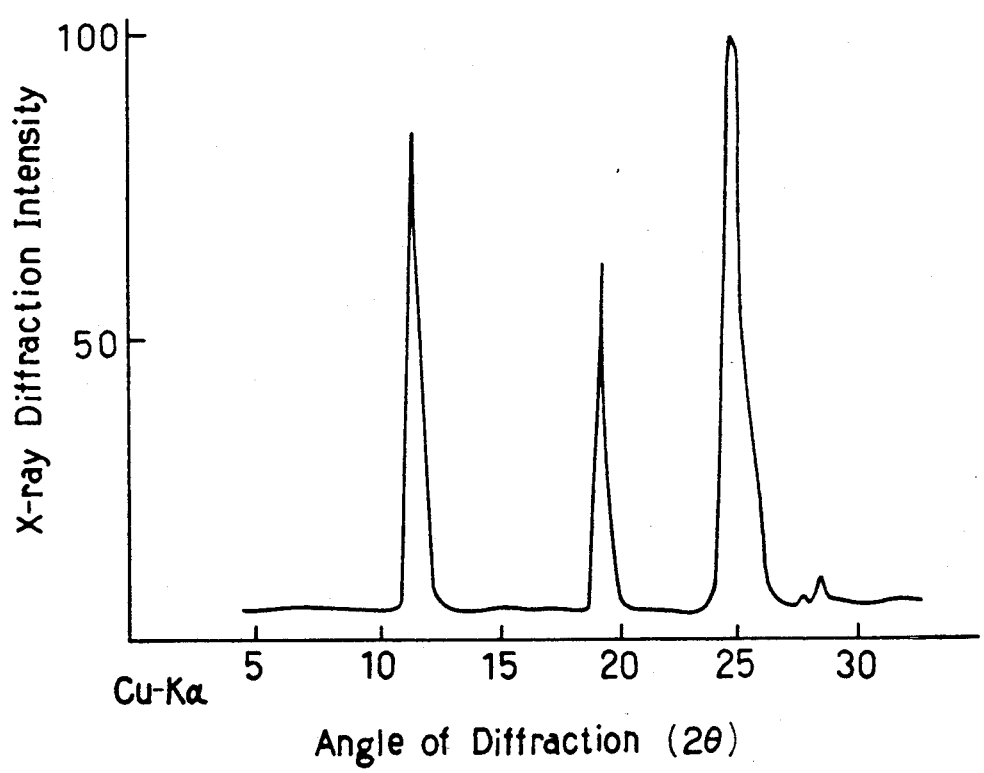
FIG. 3 is an X-ray diffraction pattern of crystalline layered zirconium hydrogenphosphate $Zr(HPO_4)_2 \cdot H_2O$ prepared by the process of the present invention.

The X-ray diffraction pattern of the air-dried product is shown in FIG. 3.

It is observed in FIG. 3 that there are strong peaks at an angle slightly beyond 10°, an angle near 20° and an angle near 25°. This pattern agreed with the X-ray diffraction pattern of existing crystalline layered zirconium(IV) bis(hydrogenphosphate) monohydrate $Zr(HPO_4)_2 \cdot H_2O$.

EXAMPLE 5

In a porceline crucible, 11.6 g of titanium hydroxide $[Ti(OH)_4]$ and 34.6 g of 85% phosphoric acid were thoroughly admixed ($P_2O_5/TiO_2 = 1.5/1.0$ by mole). The resulting mixture was placed together with the crucible in an electric furnace maintained at 110° C., and the reaction was conducted at 110° C. for 5 hours with blowing steam of 110° C. into the furnace. The product was a white solid. It was washed with water and dried at 50° C.

The X-ray diffraction pattern of the dried product agreed with that of existing crystalline layered titanium(IV) bis(hydrogenphosphate) monohydrate $Ti(HPO_4)_2 \cdot H_2O$.

EXAMPLE 6

In 500 ml of pure water was dissolved 23.5 g of a water-soluble zirconium salt $ZrOCl_2$. To the resulting solution was gradually added dropwise 46.1 g of 85% phosphoric acid with stirring ($P_2O_5/ZrO_2 = 1.5/1.0$ by mole). The resulting white gel-like precipitate was centrifuged and placed in a porceline crucible. To the precipitate was further added 30.0 g of 85% phosphoric acid, and they were thoroughly admixed. The mixture was placed together with the crucible in an electric furnace kept at 130° C., and the reaction was carried out at 130° C. for 4 hours with introducing steam of 130° C. into the furnace. The reaction product was then washed with water and air-dried.

The product indicated the same X-ray diffraction pattern as that in Example 4 shown in FIG. 3, thus it was confirmed that the product was crystalline layered zirconium(IV) bis(hydrogenphosphate) monohydrate $[Zr(HPO_4)_2 \cdot H_2O]$.

EXAMPLE 7

In 500 ml of pure water was dissolved 43.3 of tin chloride ($SnCl_4$). Separately, 143.2 of disodium hydrogenphosphate ($Na_2HPO_4 \cdot 12H_2O$) was dissolved in 500 ml of pure water, and the resulting solution was gradually added dropwise to the tin chloride aqueous solution with stirring. The resulting precipitate was filtered off and placed in a porceline crucible. To the precipitate was further added 11.3 g of 85% phosphoric acid and they were thoroughly admixed. The ratio of disodium hydrogenphosphate/tin chloride used was 1.5/1.0 by mole in terms of $P_2O_5/SnO_2$. The mixture was placed together with the crucible in an electric furnace maintained at 200° C., and the reaction was carried out at 200° C. for 4 hours with introducing steam of 200° C. into the furnace. The obtained reaction product was washed with water and air-dried.

The air-dried product indicated the same X-ray diffraction pattern as that of existing crystalline layered tin(IV) bis(hydrogenphosphate) monohydrate $Sn(HPO_4)_2 \cdot H_2O$, thus it was confirmed that the obtained product was crystalline layered tin hydrogenphosphate $Sn(HPO_4)_2 \cdot H_2O$.

EXAMPLE 8

In a mortar were placed 15.4 g of zirconium hydroxide, 10.1 g of titanium hydroxide and 10 ml of water, and they were admixed for 5 minutes to give a uniform slurry.

In a porceline crucible was placed 81 g of 85% phosphoric acid, and the above slurry was added thereto. They were admixed, and the resulting mixture $[P_2O_5/(TiO_2+ZrO_2)=1.75/1.0$ by mole] was placed together with the crucible in an electric furnace maintained at 110° C. The reaction was carried out at 110° C. for 4 hours with blowing steam of 110° C. into the furnace. The obtained white product was washed with water and dried at 30° C.

The X-ray diffraction pattern of the obtained product indicated a mixed pattern of those obtained in Examples 4 and 5, thus it was confirmed that the product is a mixture of crystalline layered zirconium(IV) bis(hydrogenphosphate) monohydrate $Zr(HPO_4)_2 \cdot H_2O$ and crystalline layered titanium(IV) bi(hydrogenphosphate) monohydrate Ti(HPO$_4$)$_2$·H$_2$O.

EXAMPLE 9

In a mortar were placed 15.4 g of zirconium hydroxide, 23.5 g of cerium hydroxide and 10 ml of water, and they were admixed for 5 minutes to give a uniform slurry.

In a porceline crucible was placed 81 g of 85% phosphoric acid, and the above slurry was added thereto and thoroughly admixed. The resulting mixture [P$_2$O$_5$/(ZrO$_2$+CeO$_2$)=1.75/1.0 by mole] was placed in an electric furnace kept at 150° C., and the reaction was carried out at 150° C. for 5 hours with blowing steam of 150° C. into the furnace. The obtained light yellowish product was washed with water and dried at 30° C.

The product indicated a mixed X-ray diffraction pattern of those obtained in Examples 1 and 4. From this result, it was confirmed that the product was a mixture of crystalline layered cerium(IV) bis(hydrogenphosphate) dihydrate Ce(HPO$_4$)$_2$·2H$_2$O and crystalline layered zirconium(IV) bis(hydrogenphosphate) monohydrate Zr(HPO$_4$)$_2$·H$_2$O.

EXAMPLE 10

To a mortar were added 10.1 g of titanium hydroxide, 23.5 g of cerium hydroxide and 10 ml of water, and they were admixed for 5 minutes to give a uniform slurry.

The slurry was added to 81 g of 85% phosphoric acid in a porcelain crucible, and thoroughly admixed. The resulting mixture [P$_2$O$_2$/(ZrO$_2$+CeO$_2$)=1.75/1.0 by mole] was placed in an electric furnace kept at 150° C., and the reaction was carried out at 150° C. for 5 hours with introducing steam of 150° C. into the furnace. The obtained light yellowish product was then washed with water and dried at 30° C.

The product indicated a mixed X-ray diffraction pattern of those obtained in Examples 1 and 5. From this result, it was confirmed that the product was a mixture of crystalline layered cerium(IV) bis(hydrogenphosphate) dihydrate Ce(HPO$_4$)$_2$·2H$_2$O and crystalline layered titanium (IV) bis(hydrogenphosphate) monohydrate Ti(HPO$_4$)$_2$·H$_2$O.

COMPARATIVE EXAMPLE 1

The procedure of Example 1 was repeated except that the reaction was carried out at 180° C. for 4 hours without introducing steam from the outside.

The reaction mixture was nearly white. It was washed with water and air-dried.

The X-ray diffraction pattern of the air-dried product indicated only a peak for cerium oxide (CeO$_2$) used as the raw material, thus it was found that the reaction of cerium oxide and phosphoric acid did not proceed at all.

COMPARATIVE EXAMPLE 2

The procedure of Example 4 was repeated except that the reaction was carried out at 220° C. for 5 hours without introducing steam from the outside.

The X-ray diffraction pattern of the obtained product indicated only a peak for zirconium pyrophosphate (Zr$_2$P$_2$O$_7$). No desired crystalline layered zirconium hydrogenphosphate [Zr(HPO$_4$)$_2$·H$_2$O] was obtained at all.

EXAMPLE 11

Crystalline layered cerium(IV) bis(hydrogenphosphate) dihydrate Ce(HPO$_4$)$_2$·2H$_2$O was prepared in the same manner as in Example 2 except that the reaction product was washed with water and air-dried.

Crystalline layered zirconium(IV) bis(hydrogenphosphate) monohydrate Zr(HPO$_4$)$_2$·H$_2$O was prepared in the same manner as in Example 4.

Crystalline layered titanium(IV) bis(hydrogenphosphate) monohydrate Ti(HPO$_4$)$_2$·H$_2$O was prepared in the same manner as in Example 5.

Aluminum dihydrogentripolyphosphate dihydrate AlH$_2$P$_3$O$_{10}$·2H$_2$O (commercially available under the trade mark "K-Fresh" #100P from TAYCA Corporation) was purified by washing with hot water of 50° C. and drying at 90° C. for 24 hours to give a purified crystalline layered aluminum hydrogenphosphate.

The following adsorbents were prepared by using the thus prepared crystalline layered hydrogenphosphate compounds.

Adsorbent-I

The powder of Ce(HPO$_4$)$_2$·2H$_2$O was used as the adsorbent.

Adsorbent-II

To 50 g of Ce(HPO$_4$)$_2$·2H$_2$O was added 5 g of Ti(HPO$_4$)$_2$·H$_2$O, and they were mixed by a small V-shaped mixer. The obtained mixture was used as the adsorbent.

Adsorbent-III

To 50 g of Ce(HPO$_4$)$_2$·2H$_2$O was added 5 g of AlH$_2$P$_3$O$_{10}$·2H$_2$O, and they were mixed by a small V-shaped mixer. The obtained mixture was used as the adsorbent.

Adsorbent-1

The powder of Zr(HPO$_4$)$_2$·H$_2$O was used as the adsorbent.

Adsorbent-2

The powder of Ti(HPO$_4$)$_2$·H$_2$O was used as the adsorbent.

Adsorbent-3

The powder of AlH$_2$P$_3$O$_{10}$·2H$_2$O was used as the adsorbent.

The liquid phase adsorption test of the thus prepared adsorbents was made. The testing liquids and testing method were as follows:

(a) Testing liquids

An aqueous solution containing cesium ion and an aqueous solution containing sodium ion were prepared by dissolving cesium nitrate or sodium chloride in pure water to give testing liquids A to F having an ion concentration described below.

Testing liquid A: aqueous solution containing 150 millimoles/l of cesium ion

Testing liquid B: aqueous solution containing 150 millimoles/l of sodium ion

Testing liquid C: 0.1N HCl aqueous solution containing 150 millimoles/l of cesium ion Testing liquid D: 0.1N HCl aqueous solution containing 150 millimoles/l of sodium ion Testing liquid E: aqueous solution containing 150 millimoles/l of cesium ion and 150 millimoles/l of sodium ion Testing liquid F: aqueous solution containing 15 millimoles/l of cesium ion and 150 millimoles/l of sodium ion (b) Testing method To each of 50 ml portions of the above testing liquids A to F was separately added 1 g of each of the adsorbents I to III and 1 to 3, and the testing liquids were shaked for 24 hours by a constant temperature shaking device.

After the shaking, the concentrations of cesium ion and sodium ion were measured by an atomic adsorption spectrophotometry.

The decrease of each ion was calculated from the change in concentrations of cesium and sodium ions before and after testing, and from the decrease the amounts of ions adsorbed by the adsorbent were calculated.

The results are shown in Table 1.

TABLE 1

| | Amount of ions adsorbed (millimole/g) | | | | | | | |
|---|---|---|---|---|---|---|---|---|
| | Testing liquid A | Testing liquid B | Testing liquid C | Testing liquid D | Testing liquid E | | Testing liquid F | |
| | cesium ion | sodium ion | cesium ion | sodium ion | cesium ion | sodium ion | cesium ion | sodium ion |
| Adsorbent I | 1.0 | 0.2 | 0.6 | 0.0 | 1.0 | 0.1 | 0.6 | 0.1 |
| Adsorbent II | 1.2 | 0.3 | 0.6 | 0.1 | 1.2 | 0.3 | 0.8 | 0.3 |
| Adsorbent III | 1.1 | 0.3 | 0.5 | 0.0 | 1.0 | 0.4 | 0.6 | 0.4 |
| Adsorbent 1 | 0.1 | 0.0 | 0.0 | 0.0 | 0.1 | 0.0 | 0.0 | 0.0 |
| Adsorbent 2 | 0.5 | 0.5 | 0.2 | 0.3 | 0.5 | 0.6 | 0.2 | 0.8 |
| Adsorbent 3 | 0.1 | 0.7 | 0.0 | 0.2 | 0.1 | 0.8 | 0.0 | 0.8 |

From the results of the tests for the testing liquids A, C, E and F, it would be apparent that the adsorbents I to III according to the present invention can adsorb a larger amount of cesium ion as compared with the adsorbents 1 to 3, and they are effective for treating waste liquids containing radioactive materials.

As apparent from the results of the tests for the testing liquids B and D, the amount of sodium ion adsorbed by the adsorbents I to III is small. Also, as apparent from the results of the tests for the testing liquids E and F, the adsorbents I to III selectively adsorb cesium ion. From these results, particularly from the results of the tests for the testing liquid F, it would be apparent that the adsorbents according to the present invention can selectively adsorb cesium ion from a liquid containing a trace amount of cesium ion.

Also, comparing the adsorbent I with the adsorbents II and III, the adsorbent I adsorbs a less amount of sodium ion than the adsorbents II and III, thus it is superior in cesium ion selectivity. However, with respect to the amount of cesium ion adsorbed itself, the adsorbents II and III are larger than the adsorbent I, and these results indicate that a synergistic effect is produced by a combination use of the crystalline layered cerium hydrogenphosphate and other crystalline layered hydrogenphosphates.

In addition to the ingredients used in the Examples, other ingredients can be used in the Examples as set forth in the specification to obtain substantially the same results.

What we claim is:

1. A process for preparing a crystalline layered hydrogenphosphate which comprises reacting a tetravalent metal compound and a phosphoric acid source at an elevated temperature while introducing steam into the reaction system from outside the reaction system.

2. The process of claim 1, wherein the reaction is carried out at a temperature of 80° to 300° C.

3. The process of claim 1, wherein said phosphoric acid source and said tetravalent metal compound are present in a ratio of 0.5/1.0 to 2.5/1.0 by mole in terms of $P_2O_5/MO_2$ where M is a tetravalent metal element.

4. The process of claim 1, wherein said tetravalent metal compound is at least one member selected from the group consisting of an oxide, hydroxide, carbonate, sulfate, nitrate and chloride of at least one metal element selected from the group consisting of cerium and metal elements of Group IV of the Periodic Table.

5. The process of claim 1, wherein said phosphoric acid source is at least one member selected from the group consisting of phosphoric acid and phosphoric acid salts.

6. The process of claim 1, wherein said tetravalent metal compound is a water-insoluble solid powder, and it is mixed with phosphoric acid and subjected to the reaction.

7. The process of claim 1, wherein said tetravalent metal compound is a water-insoluble solid powder, and an aqueous slurry thereof is mixed with phosphoric acid and subjected to the reaction.

8. The process of claim 1, wherein said tetravalent metal compound is a water-soluble compound, and an aqueous solution thereof is mixed with phosphoric acid or an aqueous solution of a phosphoric acid salt and the resulting precipitate is subjected to the reaction.

9. A process for preparing a crystalline layered hydrogenphosphate which comprises reacting a tetravalent metal compound and a phosphoric acid source at an elevated temperature while introducing a sufficient amount of steam for accelerating the reaction into the reaction system from outside the reaction system.

* * * * *